United States Patent
Murray

[15] 3,669,901
[45] June 13, 1972

[54] CORROSION INHIBITOR COMPOSITION CONTAINING ZINC, SULFAMATE, AND PHOSPHATE IONS

[72] Inventor: William Bruce Murray, 929 Terraine Avenue, Long Beach, Calif. 90804

[22] Filed: Oct. 22, 1970

[21] Appl. No.: 83,203

Related U.S. Application Data

[60] Division of Ser. No. 76,221, Sept. 8, 1970, abandoned, Continuation-in-part of Ser. No. 892,842, May 5, 1969, abandoned.

[52] U.S. Cl. ................................252/387, 21/2.7, 106/14, 252/389, 252/391
[51] Int. Cl. ......................................C23f 11/16, C23f 11/18
[58] Field of Search ....................252/387, 389, 391; 21/2.7; 106/14

[56] References Cited

UNITED STATES PATENTS

| | | | |
|---|---|---|---|
| 2,155,046 | 4/1939 | Griffith et al. | 252/387 |
| 3,170,883 | 2/1965 | Owen et al. | 252/187 |
| 3,211,659 | 10/1965 | Pikaar | 252/142 |
| 3,215,637 | 11/1965 | Clerbois | 252/387 |
| 3,580,934 | 5/1971 | Murray et al. | 252/389 |

*Primary Examiner*—Richard D. Lovering
*Assistant Examiner*—Irwin Gluck
*Attorney*—J. Gibson Semmes

[57] ABSTRACT

A liquid corrosion inhibitor and method designed for use by water treatment plants for the control of corrosion of municipal, industrial, commercial and domestic metal piping systems, wherein, as the inhibitor is economically added to the flowing water supply in minute dosages, it passivates the surface of the metal piping as it deposits a self-controlled film of insoluble zinc phosphate. One of the preferred inhibitors is "-zinc-sulfamate-orthophosphate." To be effective, the pH must be controlled to within the range of 5–9.

9 Claims, No Drawings

CORROSION INHIBITOR COMPOSITION CONTAINING ZINC, SULFAMATE, AND PHOSPHATE IONS

CROSS REFERENCE TO RELATED APPLICATIONS

This is a division of my U.S. Pat. application, Ser. No. 76,221 filed Sept. 28, 1970 entitled CORROSION INHIBITING COMPOSITIONS AND METHOD which is a continuation-in-part of my Ser. No. 829,842 filed 5 May, 1969 and entitled METHOD OF INHIBITING CORROSION OF A FERROUS SURFACE, now abandoned.

BACKGROUND OF THE INVENTION

Iron, when immersed in a supply of aerated water which is slightly acid to slightly alkaline (pH 6.5–8.3), develops local anode and cathode sites on its surface. These sites or cells, formed as a result of impurities or intermolecular stresses in the iron, have a potential of $-0.41$ volt, which sponsors a current flow through the base metal and the electrolyte (water supply). At the anode iron is converted from metallic to ionic state, while at the cathode either ionic hydrogen or dissolved oxygen is reduced, causing the surface of the cathode to become alkaline, reference the following formulas:

(A) (Anode reaction)
$Fe = Fe^{++} + 2e$
(B) (Cathode Reactions)
  (1) Oxygen reduction
  $2e + H_2O + \frac{1}{2}O_2 = 2OH^-$
  (2) Ion reduction
  $2e + 2H_2O = 2OH^- + H_2$
(C) (Combining of the two electrode products yields ferrous hydroxide):
$Fe^{++} + 2HO^- = Fe(OH)_2$ 1. Field of the Invention The process and composition are each adapted to the treatment of open and closed water systems such as may contain potable or non-potable flows. These objectives are adaptable to protection of ferrous and non-ferrous metals against corrosive waters, including variations between aerated soft meteorological and high total dissolved solids water supplies.

2. Description of the Prior Art

The known prior art is best represented by U.S. Pat. No. 3,284,368 including a zinc and hexametaphosphate corrosion inhibitor. Calcium carbonate as an inhibitor is also currently practiced.

Other non-anticipatory art includes the following patents and publications:

| | |
|---|---|
| 2,080,299 | Benning et al |
| 2,316,810 | Romig |
| 2,711,391 | Kahler |
| 2,793,932 | Kahler |
| 2,872,281 | Kahler |
| 2,900,222 | Kahler |
| 3,024,201 | Bregman |
| 3,116,178 | Upham |
| 3,120,425 | Hatch |
| 3,151,087 | Ryznar et al |
| 3,347,797 | Kuegemann et al |

Butler; Ison; *Corrosion and its Prevention in Waters*, Reinhold, 1966. Chap. 1, pp. 2
Uhlig; *Corrosion and Corrosion Control*, Wiley, 1965. Chap. 6, pp. 79
LaQue, Copson; *Corrosion Resistance of Metals and Alloys*, Reinhold, 2nd Ed., Chap. 4, pp. 83.

SUMMARY OF THE INVENTION

A process and composition of matter effective in minimizing pitting and tuberculation on the interior surfaces of ferrous and non-ferrous water distribution plumbing systems. Corrosive waters ranging from aerated soft meteorological to high total dissolved solid supplies are initially treated herein through the introduction of small but effective quantities of "-zinc-sulfamate-orthophosphate" inhibitor whereby the inhibitor solution, when applied to the water, passivates the surface of the corroding interior metal of piping systems by depositing a zinc phosphate film thereover, effectively preventing diffusion of dissolved oxygen. Selective diminution in application of the inhibitor solution to 1 ppm zinc, or less, in the corrosive water sustains the protective zinc phosphate film.

As either a potable or non-potable water addition, the zinc, sulfamic and phosphate ions would not exceed 3 ppm. The pH of the treated water is to be maintained at between 5 and 9; preferably for potable water at between 6.5 and 8.4.

DESCRIPTION OF THE PREFERRED EMBODIMENTS

To explain the theory of passivation hereunder, consider the inhibitor at a dosage of 3 ppm zinc or less is being applied to a slightly acidic to slightly alkaline water (pH 6.5–8.3). Of the ions contained in the inhibitor, zinc, sodium, hydrogen, phosphate, sulfate and sulfamate, the zinc and phosphate ions tend to precipitate in the water environment but are usually in the colloidal state.

(D) $3Zn^{++} + 2PO_4^{\equiv} = Zn_3(PO_4)_2$

This compound is preferably so finely divided that it resists settling from the bulk of the electrolyte, and it can only be removed by centrifuging and ultrafiltration. The zinc phosphate has a very important characteristic in that it adheres tenaciously to most of the common plumbing materials, i.e., metals, glass, plastic or rubber. Film studies on glass and metals have indicated a deposit in the order of a molecule thickness ($1 \times 10^{-5}$ in.) at zinc dosage rates of 1 ppm zinc added continuously to a flowing alkaline (pH 8.3) water supply. If the inhibitor is not applied at dosage values exceeding 2 to 3 ppm zinc, the film will not deposit on itself and accumulate as in the case of a thickly precipitated calcium carbonate scale.

Metals are protected by the present thinly deposited zinc phosphate film, which presumably is insoluble in water, and as such it restricts the corrosive effects of the gases, dissolved oxygen and carbon dioxide. This film attaches itself so firmly to materials that it cannot be easily washed or rubbed off. It is, of course, subject to the abrasive action of suspended solids in a flowing water stream and in the environment of a mineral or a strong fruit acid it dissolves. Thus, once a freshly installed metal is exposed to water treated with the inhibitor, it can be anticipated that the surface of the metal will be passivated and the process of normal metallic corrosion will be prevented. Existing pre-rusted or corroded metals will be afforded protection in such a treated water supply because of the passivation induced by the film deposited on the surfaces of the tubercules or other deposits. Once a plumbing system has become passivated, as is evidenced by the presence of the zinc phosphate at the extremities of the distribution system or termination of the metallic plumbing, the initial "pre-coat" dosage of inhibitor may be dropped to some low value so as to just maintain the deposited film and to protect against mechanical damage.

As indicated, the formulation develops the zinc, sulfamate and phosphate ions, through either a combination of zinc oxide, sulfamic acid and phosphoric acid or zinc sulfate, sulfamic acid and monosodium orthophosphate. Suitable sources for the zinc include zinc chloride, zinc oxide, zinc sulfate, metallic zinc, zinc carbonate, sodium zincate and/or zinc phosphate. Suitable sources for the phosphate ion includes orthophosphoric acid or salts of orthophosphoric acid. Sources of the sulfamate ion include principally sulfamic acid. This ion is important in part in retaining the zinc in solution against minor pH fluctuations.

The mol ratios are maintained, regardless of the starting product and are generally represented by the formula comprising 3 atoms of zinc to 2 mols of phosphate, thus:

$3Zn^{++} + 2PO_4^{\equiv} = Zn_3(PO_4)_2$

Assuming that the pH is maintained at between 5 and 9, a suitable liquid formulation containing approximately 3 atoms of zinc as zinc sulfate monohydrate ($ZnSO_4 \cdot H_2O$), one mol of anhydrous sulfamic acid ($HNH_2SO_3$) and 3 mols of orthophosphoric acid ($H_3PO_4$) diluted in water may be employed herein or a dry mixture may be prepared from zinc sulfate monohydrate with sulfamic acid and sodium phosphate, monobasic ($NaH_2PO_4$).

One specific potable water formulation would include the following: zinc sulfate monohydrate 56 weight percent; sulfamic acid at 20 weight percent and monosodium orthophosphate at 24 weight percent.

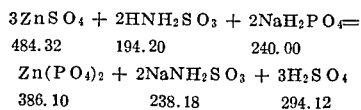

$$3ZnSO_4 + 2HNH_2SO_3 + 2NaH_2PO_4 =$$
$$Zn(PO_4)_2 + 2NaNH_2SO_3 + 3H_2SO_4$$

Ten gallons of an aqueous solution containing one pound of zinc per gallon can be prepared by adding a 50 pound composite of the ingredients to 8.25 gallons of water:

| | |
|---|---|
| $ZnSO_4 \cdot H_2O$ | 27.65 lbs. |
| $HNH_2SO_3$ | 10.00 lbs. |
| $NaH_2PO_4$ | 12.35 lbs. |
| Total | 50.00 lbs. |

The inhibitor solution has the following physical characteristics:

| | |
|---|---|
| Color | water white |
| Baume | 42.9 at 20° C. |
| pH | <1.0 at 20° C. |

Ten gallons of the above solution applied to one million gallons of water will supply zinc at a level of 1.2 parts per million.

As mentioned above, dosage of the inhibitor to a corrosive water should preferably be maintained initially at a zinc concentration of 2 to 3 parts per million. This dosage should be maintained for a length of time as dictated by the level of zinc sampled at some remote point in the distribution system. When it has been determined that the zinc residual has approached the applied dosage, the treatment rate should be reduced to a continuous zinc dosage of 1 part per million or less.

The liquid and dry inhibitor formulations for potable water are also satisfactory for non-potable water treatment. Some acid and/or metaphosphate addition might be necessary for non-potable waters because of the problems associated with water concentrating (high total dissolved solids). An example of this application would be for industrial, non-potable water re-circulating and single pass supply systems containing large quantities of salts, i.e., sea water.

It has been found in practice that the orthophosphate is most desirable in contrast to the common metaphosphates and polyphosphates. The orthophosphate ion competes more favorably for the metal in waters high in chlorides and sulphates which normally tend to dissolve anode and cathode rust deposits. Zinc orthophosphate per se, being insoluble is not affected by water temperature fluctuation and has the essential effect of developing an oxygen impenetrable barrier at the corrosion site.

Tables I and II demonstrate turbidity variations due to the effect of pH and the presence of metaphosphate residual on highly buffered water (Colorado River water) treated with various dosages of inhibitor at 1, 2 and 3 ppm zinc. Of particular interest is the presence of metaphosphate which prevented the interference of calcium carbonate precipitation due to the so-called "threshold effect." The cold water temperature was 24° C. while the hot water temperature of the samples was adjusted to 80° C. for 3 hours.

TABLE I.—EFFECT OF pH ON TURBIDITY OF COLORADO RIVER WATER AT VARIOUS TREATMENT LEVELS OF ZINC SULFATE-MONOSODIUM PHOSPHATE-SULFAMIC ACID INHIBITOR

Turbidity in Jackson turbidity units [1]

| Cold (24° C.) [2] | | | | Hot (80° C.) [2] | | |
|---|---|---|---|---|---|---|
| 1 p.p.m. zinc | 2 p.p.m. zinc | 3 p.p.m. zinc | pH [3] | 1 p.p.m. zinc | 2 p.p.m. zinc | 3 p.p.m. zinc |
| 1.00 | 2.00 | 3.10 | 8.4 | 1.70 | 6.2 | 7.5 |
| 1.40 | 1.60 | 2.70 | 8.2 | 2.70 | 7.1 | 7.2 |
| 1.10 | 1.70 | 3.40 | 8.1 | 2.40 | 7.2 | 9.6 |
| 1.30 | 1.30 | 3.20 | 8.0 | 2.40 | 6.5 | 10.0 |
| 1.10 | 1.50 | 3.25 | 7.9 | 2.30 | 6.6 | 16.0 |
| 0.90 | 1.10 | 3.60 | 7.8 | 2.40 | 6.0 | 23.0 |
| 0.88 | 1.05 | 2.70 | 7.7 | 2.50 | 7.5 | 17.0 |
| 0.60 | 0.76 | 2.40 | 7.6 | 1.80 | 7.2 | 16.0 |
| 0.57 | 0.73 | 2.50 | 7.5 | 1.50 | 7.3 | 18.0 |
| 0.38 | 0.43 | 1.80 | 7.3 | 1.70 | 4.7 | 17.0 |
| 0.25 | 0.22 | 0.33 | 7.0 | 1.20 | 3.9 | 15.0 |

[1] Turbidity measurements made with a Hach Laboratory Turbidimeter are in "Jackson Turbidity Units."
[2] Turbidity read cold (24° C.) and hot (80° C.). The 80° C. temperature was maintained for 3 hours before reading.
[3] The pH adjustments were made with 0.02N $H_2SO_4$ using a Fisher Titralyzer.

TABLE II.—EFFECT OF SODIUM HEXAMETAPHOSPHATE ON TURBIDITY OF COLORADO RIVER WATER AT VARIOUS TREATMENT LEVELS OF ZINC SULFATE-MONOSODIUM PHOSPHATE SULFAMIC ACID INHIBITOR

Turbidity in Jackson turbidity units [1]

| Cold (24° C.) [2] | | | | Hot (80° C.) [2] | | |
|---|---|---|---|---|---|---|
| 1 p.p.m. zinc | 2 p.p.m. zinc | 3 p.p.m. zinc | P.p.m. SHMP [3] | 1 p.p.m. zinc | 2 p.p.m. zinc | 3 p.p.m. zinc |
| 1.2 | 2.1 | 3.6 | 0 | 2.1 | 6.2 | 8.5 |
| 0.74 | 1.9 | 3.3 | 1 | 2.0 | 6.0 | 7.1 |
| 0.74 | 1.6 | 2.8 | 2 | 2.2 | 5.3 | 7.0 |
| 0.58 | 1.5 | 2.8 | 3 | 1.8 | 5.2 | 7.3 |
| 0.53 | 1.4 | 2.7 | 4 | 1.8 | 4.7 | 7.2 |
| 0.49 | 1.6 | 2.2 | 5 | 1.7 | 5.2 | 6.2 |
| 0.51 | 1.1 | 2.5 | 6 | 1.8 | 4.2 | 6.2 |
| 0.46 | 1.1 | 2.2 | 7 | 1.6 | 4.2 | 6.9 |
| 0.42 | 1.1 | 1.9 | 8 | 1.5 | 4.1 | 5.6 |
| 0.42 | 0.59 | 1.7 | 9 | 1.6 | 2.7 | 5.3 |
| 0.37 | 0.53 | 1.7 | 10 | 2.0 | 2.7 | 4.7 |

[1] Turbidity measurements made with a Hach Laboratory Turbidimeter are in "Jackson Turbidity Units."
[2] Turbidity read cold (24° C.) and hot (80° C.). The 80° C. temperature was maintained for 3 hours before reading.
[3] Sodium hexametaphosphate.
[4] pH of water at start of test was 8.4.

A specific example of the performance of the corrosion inhibitor herein is as follows:

SAE 1010 carbon steel coupons were exposed to 0.5 gallon per minute stream of water for 30 days. The corrosion rate of the control specimen, untreated, was 85.7 mdd (milligrams per square decimeter per day), while the inhibitor treated specimen showed a corrosion rate of less than 1.0 mdd. Inhibitor film analysis showed that the treated specimen had been zinc phosphatized. The inhibitor formulation was added to the water stream on a continuous basis resulting in a treatment level equivalent to 1 ppm zinc.

I claim:

1. The composition of matter, useful as a corrosion inhibitor for ferrous and non-ferrous water conduits consisting essentially of: zinc, sulfamate and phosphate ions in mol ratio from about 3 mols zinc to 2 mols sulfamate to 2 mols phosphate, wherein the zinc and phosphate ions precipitate in water having a pH of 5 – 9 as zinc phosphate.

2. The composition of matter of claim 1 wherein the zinc ions are derived from zinc chloride.

3. The composition of matter of claim 1 in which the zinc ions are derived from metallic zinc.

4. The composition of matter of claim 1 in which the zinc ions are derived from zinc carbonate.

5. The composition of matter of claim 1 in which the zinc ions are derived from sodium zincate.

6. The composition of matter of claim 1 in which the zinc is derived from zinc sulfate monohydrate, the sulfamate is derived from sulfamic acid and the phosphate is derived from monosodium orthophosphate.

7. The composition of matter of claim 1 wherein the zinc ions are derived from a zinc salt, the sulfamate ions are derived from sulfamic acid and the phosphate ions are derived from sodium phosphate.

8. A composition of matter, useful as a corrosion inhibitor for ferrous and non-ferrous water conduits, comprising:

| A. zinc sulfate monohydrate | 50% |
| B. sulfamic acid | 20% |
| C. monosodium orthophosphate | 24% |

9. A composition aqueous solution useful as a corrosion inhibitor for ferrous and non-ferrous water conduits, the solution consisting essentially of in a water solution:

| A. zinc sulfate monohydrate | 56% |
| B. sulfamic acid | 20% |
| C. orthophosphoric acid, 85% strength | 24% |

* * * * *

UNITED STATES PATENT OFFICE
CERTIFICATE OF CORRECTION

Patent No. 3,669,901   Dated June 13, 1972

Inventor(s) William Bruce Murray

It is certified that error appears in the above-identified patent and that said Letters Patent are hereby corrected as shown below:

On the cover page, in the paragraph immediately following the title "Related U.S. Application Data" the word "abandoned" incorrectly appears after the words "Ser. No. 76,221, Sept. 8, 1970," and should be deleted, so that the paragraph should read:

"[60] Division of Ser. No. 76,221, Sept.8, 1970, Continuation-in-part of Ser. No. 829,842, May 5, 1969, abandoned."

Signed and sealed this 27th day of February 1973.

(SEAL)
Attest:

EDWARD M.FLETCHER,JR.
Attesting Officer

ROBERT GOTTSCHALK
Commissioner of Patents